May 17, 1955  S. G. BUDAI  2,708,292
MODULAR OFFICE WORK SPACE AND PARTITION STRUCTURE
Filed Nov. 14, 1951  4 Sheets-Sheet 1
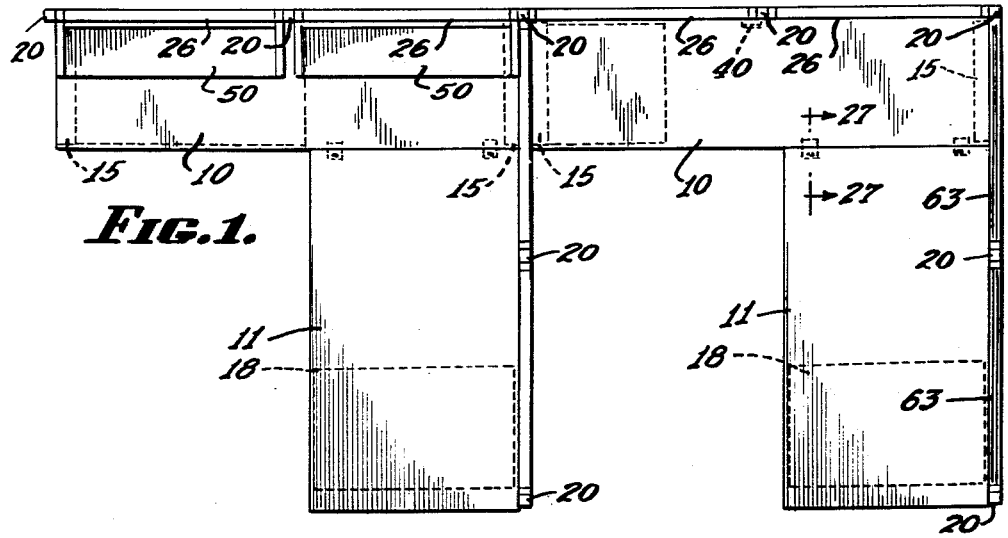
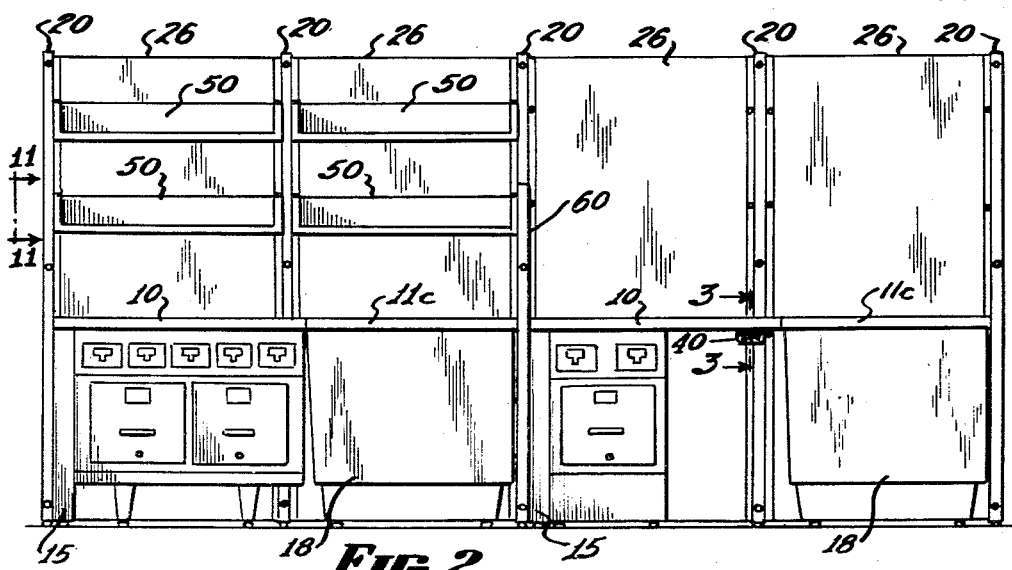
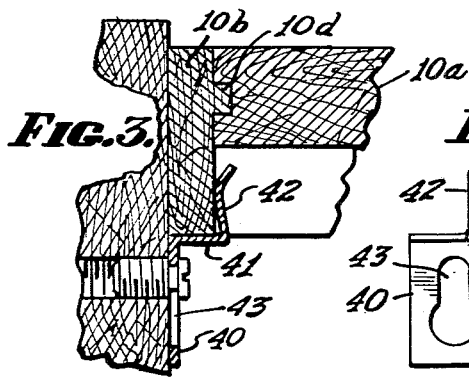
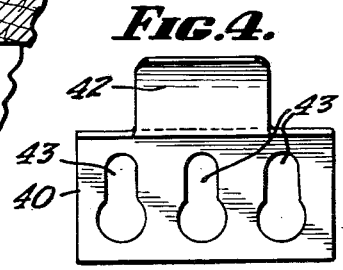
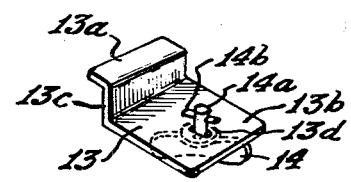
INVENTOR.
STEVE G. BUDAI,
BY
Allen & Allen
ATTORNEYS.

May 17, 1955  S. G. BUDAI  2,708,292
MODULAR OFFICE WORK SPACE AND PARTITION STRUCTURE
Filed Nov. 14, 1951  4 Sheets-Sheet 2
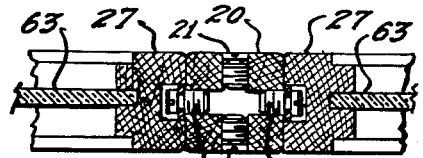
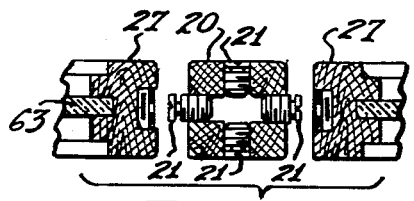
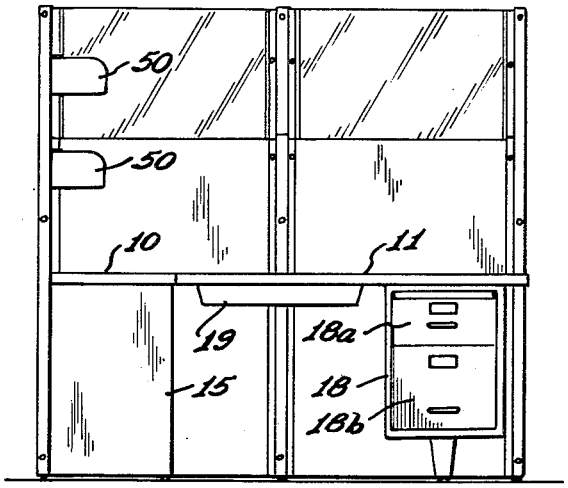
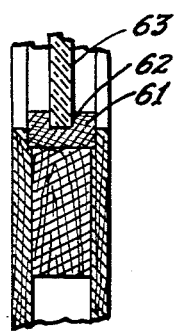
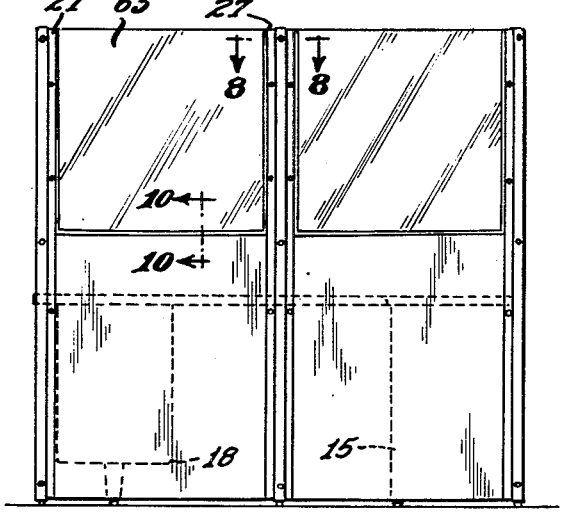
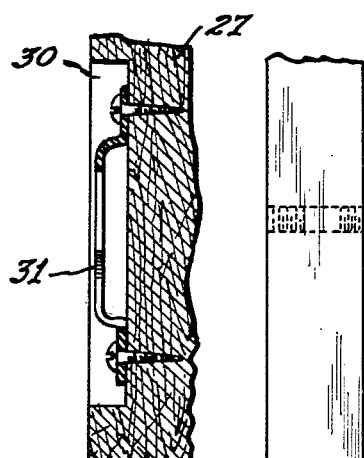
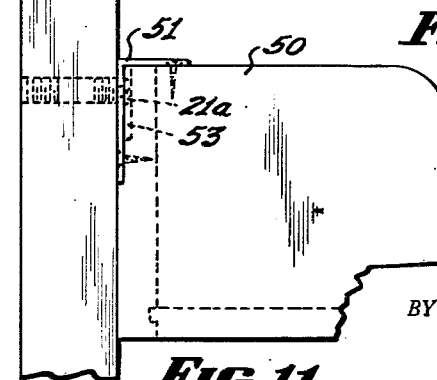
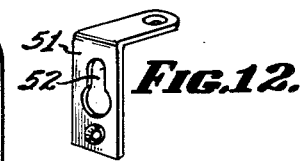
INVENTOR.
STEVE G. BUDAI,
BY
Allen & Allen
ATTORNEYS.

May 17, 1955 S. G. BUDAI 2,708,292
MODULAR OFFICE WORK SPACE AND PARTITION STRUCTURE
Filed Nov. 14, 1951 4 Sheets-Sheet 3
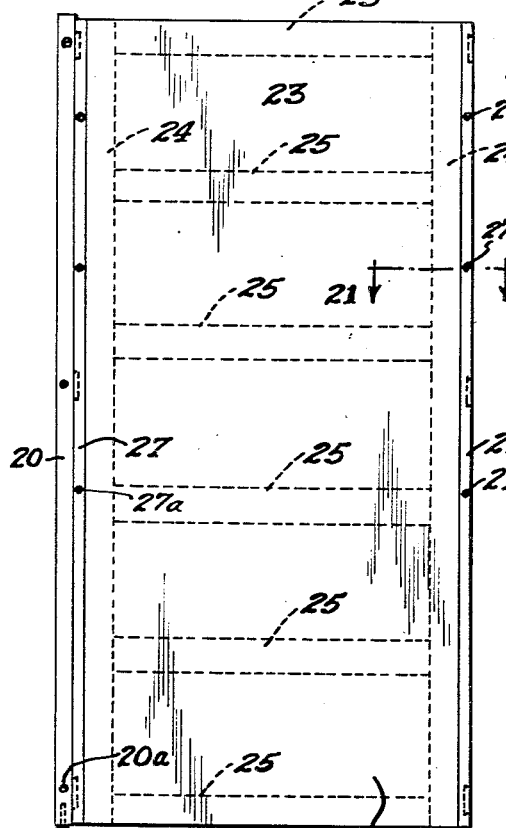
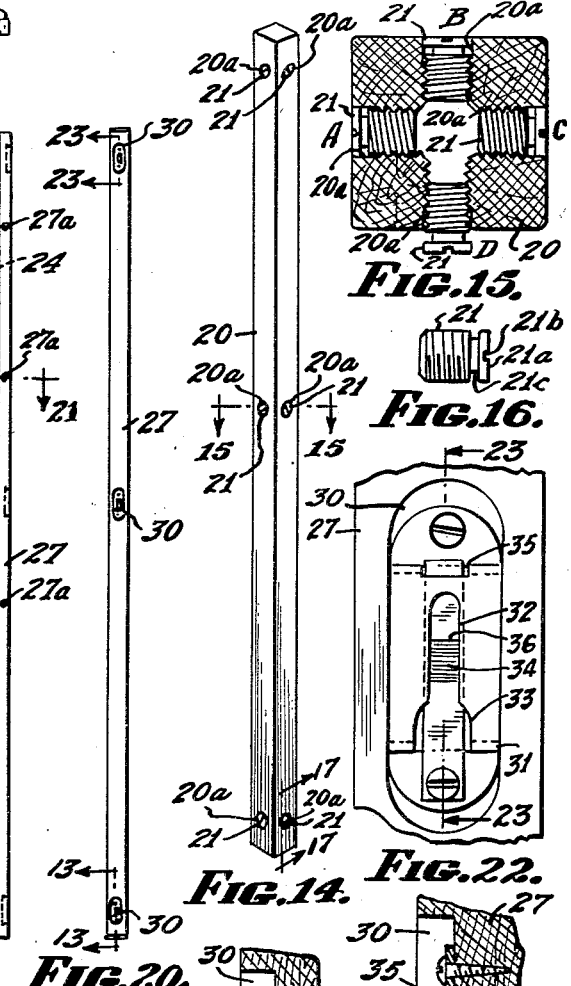
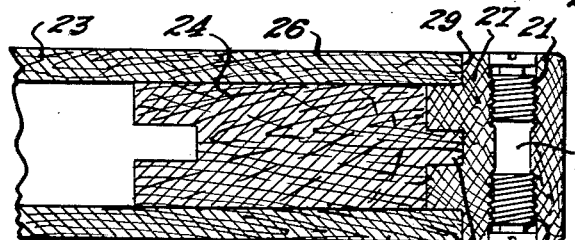
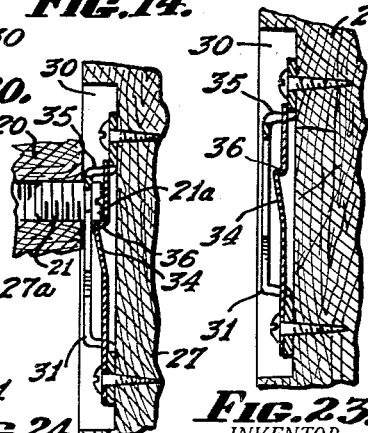
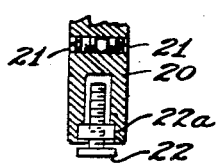
INVENTOR.
STEVE G. BUDAI,
BY Allen & Allen
ATTORNEYS.

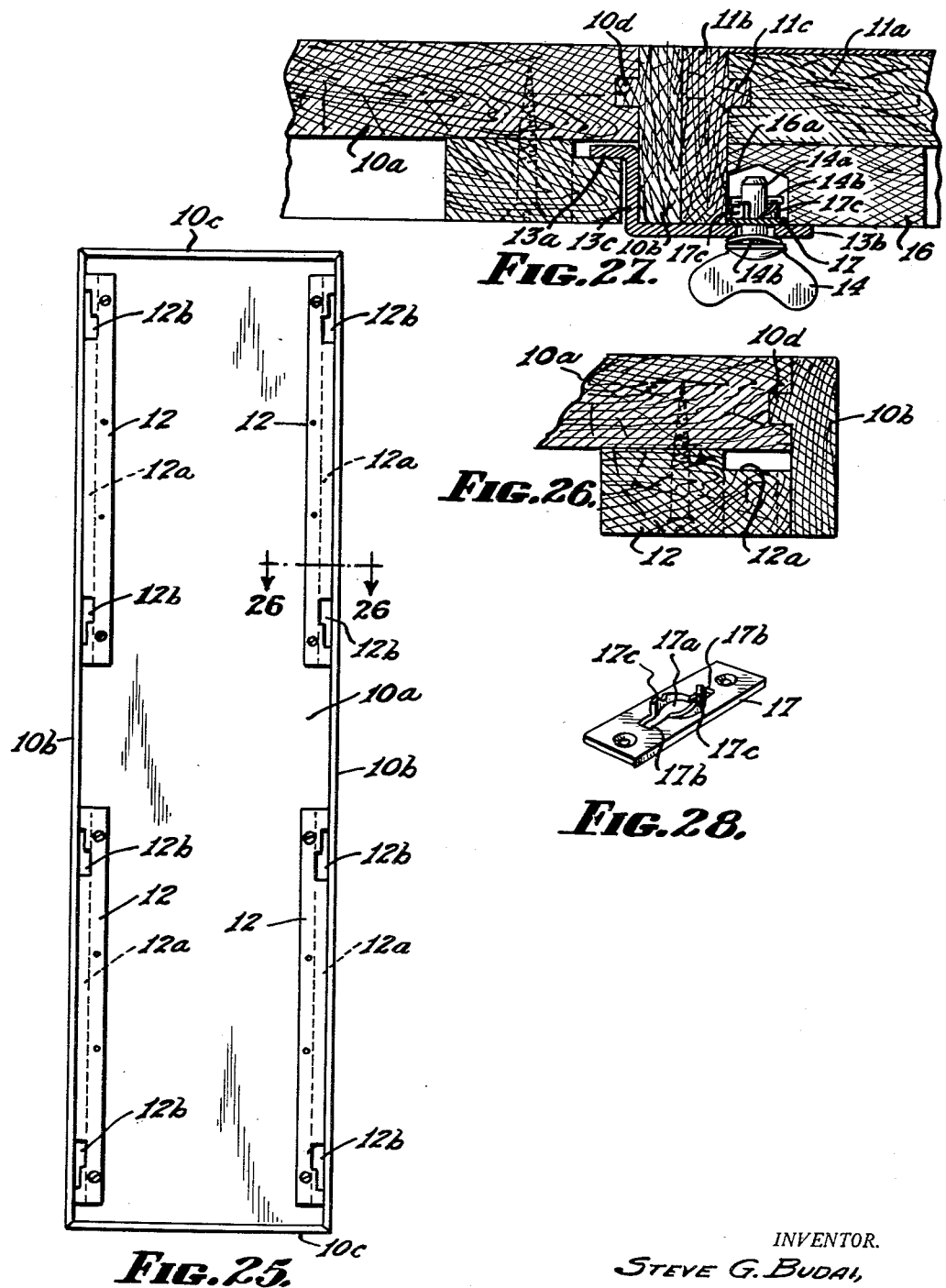

United States Patent Office 2,708,292
Patented May 17, 1955

2,708,292

MODULAR OFFICE WORK SPACE AND PARTITION STRUCTURE

Steve G. Budai, Cincinnati, Ohio, assignor to The Globe-Wernicke Co., Cincinnati, Ohio, a corporation of Ohio Application November 14, 1951, Serial No. 256,207

12 Claims. (Cl. 20—4)

This invention relates to a modular office work space and partition structure. In my copending application, Serial No. 243,261, filed August 23, 1951, and entitled Flexible Office Work Space and Partition Structure, I have disclosed a series of metal desks and table units, a post construction involving intermediate post members, unit post members and end post members and various combinations thereof, and a series of panel elements all made essentially of sheet metal which could be assembled in an infinite number of arrangements to provide a plurality of L-shaped work spaces. Reference is hereby made to the said copending application for a full disclosure of the various possible arrangements and the various modifications in set-up.

It is an object of the present invention to disclose how the same objectives may be accomplished with wooden post members, wooden table and desk units, and wooden partition units. The various fastening elements disclosed in said copending case are not entirely suitable for use with a wood construction, and it is therefore an ancillary object of the present invention to disclose certain specific securing or fastening means useful in assembling the structure of the present invention.

It is yet another object of the invention to provide for a universal post construction, which will be simple and inexpensive in manufacture, and can be used in all situations.

These and various other objects of the invention which I shall point out in more detail hereinafter, or which will be apparent to one skilled in the art upon reading these specifications, I accomplish by that certain construction and arrangement of parts of which I shall now disclose certain exemplary embodiment.

Reference is made to the drawings forming a part hereof, and in which:

Figure 1 is a plan view of an assembly of two L-shaped work spaces;

Figure 2 is an elevational view of the same;

Figure 3 is a fragmentary cross sectional view on a greatly enlarged scale taken on a line 3—3 of Figure 2;

Figure 4 is an elevational view of the clip member shown in Figure 3;

Figure 5 is a perspective view of another securing member, the use of which is shown in Figure 27;

Figure 6 is an elevational view as seen from the left of Figure 2;

Figure 7 is an elevational view as seen from the right side of Figure 2;

Figure 8 is a fragmentary cross sectional view on a greatly enlarged scale taken on a line 8—8 of Figure 7;

Figure 9 is a view similar to Figure 8 but showing the parts in exploded position;

Figure 10 is a fragmentary cross sectional view also on a greatly enlarged scale taken on a line 10—10 of Figure 7;

Figure 11 is a fragmentary elevational view as seen on a line 11—11 of Figure 2 on a greatly enlarged scale showing how a shelf member is secured in place;

Figure 12 is a perspective view of the securing member used in Figure 11;

Figure 13 is a fragmentary cross sectional view on a greatly enlarged scale taken on a line 13—13 of Figure 20;

Figure 14 is a perspective view of a post member;

Figure 15 is a cross sectional view of the same on a greatly enlarged scale taken on a line 15—15 of Figure 14;

Figure 16 is an elevational view of one of the necked screw members used in connection with the posts of Figures 14 and 15;

Figure 17 is a fragmentary cross sectional view taken on a line 17—17 at Figure 14 showing a foot member for the post;

Figure 18 is an elevational view of a panel member with a post member secured to the left side thereof;

Figure 19 is a plan view of the same;

Figure 20 is an elevational view as seen from the right side of Figure 18;

Figure 21 is a fragmentary cross sectional view on a greatly enlarged scale taken on a line 21—21 of Figure 18;

Figure 22 is a fragmentary elevational view adjacent the top of Figure 20 showing a fastening element;

Figure 23 is a cross sectional view of the same taken on a line 23—23 of Figure 22;

Figure 24 is a view similar to Figure 23 but showing the panel and post members secured together;

Figure 25 is a bottom plan view of a table unit;

Figure 26 is a fragmentary cross sectional view taken on a greatly enlarged scale taken on a line 26—26 of Figure 25;

Figure 27 is a fragmentary cross sectional view on a greatly enlarged scale taken on a line 27—27 of Figure 1, and Figure 28 is a perspective view of a cam plate used in the structure of Figure 27.

Briefly in the practice of my invention I provide desk units and table units, as well as posts and partition members. As disclosed in my said copending application an L-shaped work space is constituted by a table unit and a desk unit joined together at right angles. Partition members may be provided for each L-shaped work space by use of the partition panels and post members to be described in more detail hereinafter. While I have shown only a single arrangement in the present application it will be understood that various arrangements, such as are disclosed in my said copending application, may be made if desired.

Thus, in Figures 1, 2, 6 and 7 I have shown the table unit 10 and desk unit 11 connected together at right angles each forming an L-shaped work space. A table unit has the work surface visible in Figure 1 and consisting of a suitable board indicated at 10a in Figures 3 and 26 and 27. The periphery of the board 10a is provided with the finished strips 10b along the longitudinal edges, and the strips 10c along the short edges. These strips 10b and 10c as clearly seen in Figures 3, 26 and 27 are deeper than the thickness of the member 10a. For a more solid construction a mortise and tenon joint may be provided as indicated at 10d in these figures. Secured to the under side of the board 10a as best seen in Figures 25, 26, and 27 are the strips 12. These strips throughout their entire length are provided with the rabbet 12a and the slots 12b are provided to communicate with the rabbet 12a as best seen in Figure 25. These slots as clearly seen in Figure 25 have a portion extending the full width of the rabbet and an extension approximately less than half the width of the rabbet.

The construction just described is for the purpose of attaching the fastening elements indicated generally at 13 and best seen in detail in Figure 5. These members 13 are of sheet metal and are generally of Z-shape having a relatively short arm 13a and a relatively long arm 13b connected by a web portion 13c. The portion 13b has a hole 13d therethrough for the passage of the shank 14a of the locking device 14. The shank 14a is provided with the pin 14b. The member 13 is assembled to a table unit as clearly seen in Figure 27. The portions 13a and 13b are inserted through the wide part of the slot 12b and then moved longitudinally of the table top into the narrow part of the slot 12b. In the latter position the parts will look as seen in Figure 27 providing an outwardly extending arm 13b carrying the locking member 14. A spring washer 14b is preferably provided around the shank 14a as seen in Figure 27. The structure just described is for the purpose of fastening a desk unit to a table unit as will be described hereinafter. The table unit is provided with leg members 15 which may be of plywood in a hollow box type of construction.

From a consideration of Figure 2 it will be observed that the portion underneath the table unit may be occupied by a file cabinet of any desired construction, and since such file cabinets do not form any portion of the present invention they have been illustrated in a more or less conventional style and will not be described further.

The desk unit indicated generally at 11 is provided with a top constituted of a board 11a, and is provided with framing strips 11b and 11c similar to the strips 10b and 10c described above. Again the mortise and tenon structure 11d may be provided as described above in connection with the mortise and tenon structure 10d. On the under side of the board 11a there are provided the strips 16 corresponding generally to the strips 12 of the table unit and the strips 16 are provided with a rabbet extending longitudinally the entire length of the strip. An aperture 16a is provided in said rabbet and the plate 17 of Figure 28 is set into the rabbet over the aperture 16a. Each desk top is provided with two plates 17 at the end opposite the pedestal 18 of Figure 6. Centrally of the plate there is an aperture 17a having diametrically opposed extension 17b. Commencing from each of the extensions 17b is a curved cam member 17c, which may be of material struck out from the aperture 17a. From the foregoing description it will be clear that when it is desired to secure a desk unit and table unit together, the member 13 with its associated parts is assembled to the table unit as heretofore described, and then the desk unit is butted against the table unit so that the shank 14a extends up through the aperture 17a with the pin 14b passing through the extension 17b in the plate 17. The member 14 is then given approximately a quarter turn in a clockwise direction so that the pin 14b rides up on the cam surfaces 17c and locks the two units tightly together. Thus, the units may be separated by simply turning the member 14 in a counterclockwise direction approximately a quarter turn.

The desk unit as best seen in Figure 6 is preferably provided with a pedestal 18 which may be of the "island" type as shown, or of any other desired construction, and which may be provided with drawers 18a and 18b if desired. A center drawer 19 is also provided if desired. Since the details of the construction of the desk itself form no part of the present invention such a desk will not be described further.

For the purpose of connecting the various panel units together and for the attachment of the desk and table units thereto, I provide a series of post members best seen in Figure 14 and indicated generally at 20. These post members are all identical and are square in cross section. Adjacent the bottom, adjacent the top, and approximately at the center on each face of the post 20, there is provided a drilled and tapped hole 20a. The center lines of the holes 20a are all in the same horizontal plane so that any post may be used regardless of its orientation. For each hole 20a there is provided a necked screw 21 shown in detail in Fig. 16. This screw 21 has a portion which is threaded to engage the threads in the hole 20a, and a head 21a provided with a screw driver slot 21b which is separated from the body of the screw by a neck 21c.

As best seen in Figure 15 where nothing is to be fastened to a post in the region of any one of these screws, the screw is simply screwed in so that its outer face is flush with the face of the post, as seen at the positions A, B and C, in Figure 15. If something is to be attached to the post at one of the screw positions, the screw is unscrewed until the neck portion extends outwardly from the face of the post as indicated at position D in Figure 15. Each post will come equipped with twelve screws in the embodiment shown, and regardless of the use to which the post is put, all twelve screws remain in their respective threaded holes. Those which are not being used are left as indicated at A, B and C, and those which are to be used are slightly screwed out as shown at D.

As shown in Figure 17, the bottom of the post may be axially drilled, counterbored and provided with a nut 22a for a leveling foot indicated generally at 22.

Referring now in more detail to Figures 18 to 24 inclusive, a panel member is generally indicated at 23, and the panel member may consist of vertical frame members 24 and transverse frame members 25, the framework constituted by the members 24 and 25 being covered on both sides with plywood or the like. The plywood covering is indicated at 26. Preferably the plywood covering 26 extends slightly beyond the frame member 24 at both sides of the panel and end strips 27 are secured to the panels as best seen in Figure 21. The members 27 may have the mortise and tenon construction 28 if desired and are rabbeted at 29 to accept the plywood coverings 26. The members 27 are provided on opposed sides with the three holes 27a, which are drilled and threaded in the same way as the holes 20a, and again each hole 27a is provided with the identical screws 21 described above. The purpose of the screws will be described hereinafter.

On the outwardly directed face of the members 27 are provided three recesses 30. In these recesses are seated devices to engage with the screws 21 in a post 20 for the purpose of securing a post to a panel as seen at the left side of Figure 18. The structure of the fastening elements seated in the recess 30 is generally the same except that one of the three (preferably the one at the top of the panel) will be slightly modified as described hereinafter. Especially however, all the the same. In each case there is provided in the recess 30 a strap member 31 having a raised central portion. In elevation the raised portion is provided with a key hole type of slot 32 having the wider portion 33 adjacent the bottom thereof. In the case of the middle and lower-most recesses 30 this is the entire structure involved. In the case of the upper-most recess 30 a supplementary spring element 34 is employed which is secured to the structure by one of the screws which secures the strap 31 in the recess as best seen in Figures 23 and 24, and it extends through the key hole slots 32, 33 and passes through an aperture 35 at the upper end of the strap. In the region of the slot 32 the spring member 34 is provided with a protuberance 36.

When it is desired to secure a post 20 to a panel the three screws 21 on the face of the post, which is to bear against the edge of the panel, are unscrewed to the position shown at D in Figure 15. The heads of the screws pass respectively through the wide portions 33 of the slots 32 and then the entire post 20 is pushed upwardly in relation to the panel so that the necked portion 21c of the screws passes into the narrow portion 32 of the key hole type slot. The portion 33 of the slot is of a width to admit the entire head 21a of the screw, while the portion 32 is of a width to permit passage of the neck 21c but not the head 21a. If the structure were that shown in Figure 13 for all three fastening elements it would be very easy accidentally to dislodge a post from a panel, and therefore, in the uppermost fastening structure I provide the structure disclosed in Figures 23 and 24 so that the protuberance 36 snaps outwardly after the head 21a of the screw has passed it so as to hold it in position against accidental displacement. The post can still be separated from the panel but it requires additional pressure to force the head 21a past the protuberance 36 of the spring 34.

A series of panel members 23 and posts 20 may thus be secured together, either in a continuous line or with right angle partitions extending therefrom in one or both directions.

In order to secure a desk or table unit top to a post I have provided the fastening device indicated generally by the numeral 40 and shown in detail in Figure 4. The device 40 may be made of sheet metal and is provided with a ledge portion 41 and a flange portion 42. The major portion of the member 40 is provided with three key hole slots indicated at 43. The slots 43 have a portion of a size to admit the head of a screw 21 and a portion which is smaller than the screw head 21a, but which will permit passage of the neck portion 21c of the screw. Thus, if it is desired, as shown in Figures 2 and 3, to secure a table top to a panel, one of the screws 21 is slightly unscrewed from its tapped hole 27a in the member 27. A member 40 is then secured thereto as shown in Figure 3, and the table top is then secured also as shown in Figure 3. The member 40 is provided with three of the slots 43 so that the member 40 may be used interchangeably in various positions as required by the particular arrangement.

In Figures 1, 2 and 6, I have shown shelf units 50 mounted upon one of the panels. These shelf units are mounted in the same way as described above in connection with the member 40. In this instance, I provide the fastening element 51 shown in detail in Figure 12 and having the key hole slot 52. One of the screws 21 is slightly unscrewed from its hole 27a in the members 27, and a shelf member 50, to which a member 51 has been secured as seen in Figure 11, is dropped in place. In order to accommodate the head 21a of the screw, a recess 53 is provided in the back wall of the shelf member.

The panel members heretofore described have been of wood and have been the full length of the post 20. It may be desirable in a lateral branch partition that the posts and panels be of less height. Thus, in Figure 2 I have shown a panel indicated generally at 60 which is of less height than the standard panel. In other respects the construction is, of course, the same.

It will also be understood that the panel members may be modified to provide upper portions of glass as best seen in Figures 7 and 10. In such case the framework of the partitions is modified to the extent of providing an upper frame element 61 having a groove 62 to accept a pane of glass 63. The end pieces 27 of the panel 23, however, extend the full height of the panel and the mortise, otherwise used for the mortise and tenon joint 28 shown in Figure 21, serves to seat the vertical edges of the glass panel.

While I have shown certain specific construction, it will be clear that numerous modifications may be made without departing from the spirit of my invention, and it will thus be clear that I do not intend to limit myself otherwise than as set forth in the claims which follow.

Having now fully disclosed my invention, what I claim as new and desire to secure by Letters Patent is:

1. In a modular office work space structure, a partition unit comprising an elongated rectangular framework, panels covering said framework on both sides, and end strips secured to said framework and panels along the long edges thereof, each of said end strips being provided, front and back, with a plurality of fastening elements each comprising a threaded hole and a necked screw engaging in said threaded hole, said screw having a head to fit snugly within said hole whereby it may be screwed in flush with the surface of said strip when not required for fastening purposes.

2. The structure of claim 1 wherein female fastening elements are provided along the end faces of said strips.

3. The structure of claim 1 wherein said strips on the face secured to said framework are provided with a longitudinal mortise, and said framework is provided with a mating tenon.

4. The structure of claim 3 wherein said strips are longer than said framework and panels, and wherein a piece of plate glass is engaged in said mortises beyond said panels.

5. The structure of claim 1 wherein female fastening elements are provided along the end faces of said strips, said female fastening elements each comprising a recess having a depth greater than the thickness of said screw heads, and a plate covering said recess, said plate having a slot of a size to accept the necks of said screws but smaller than the diameter of said heads, said slots being enlarged adjacent one end to accept the heads of said screws.

6. The structure of claim 5 wherein one at least of said female fastening elements is provided with a spring biased detent under the narrow portion of said slot and spaced from the narrow end of said slot a distance slightly greater than the diameter of said heads, to permit passage of said head into fastening position and to resist passage of said head to disengaging position.

7. In a modular office work space structure, a post, said post being square in cross section, and having at spaced points longitudinally thereof, on each face, a threaded hole and a necked screw for fastening purposes engaging in said threaded hole, said screw having a head to fit snugly within said hole whereby it may be screwed in flush with the surface of said post when not required for fastening purposes.

8. The structure of claim 7 wherein said post is provided with an axial hole in the bottom of said post, a nut is seated in said hole, and a foot having a threaded shank is engaged in said nut.

9. In a modular office work space structure, a partition composed of a series of partition units with posts separating said units, each of said units comprising an elongated rectangular framework, panels covering said framework on both sides, and end strips secured to said framework and panels along the long edges thereof, each of said end strips being provided along its end face with female fastening elements, and each of said posts being square in cross section and having at spaced points longitudinally thereof, on each face, a threaded hole and a necked screw for fastening purposes engaging in said threaded hole, said screw having a head to fit snugly within said hole, said screws on two opposed faces of said posts being positioned with said heads and necks extending from said faces and engaging said female fastening elements on said units, and said screws on the remaining faces of said posts being screwed in flush with their respective faces.

10. The structure of claim 9 wherein said female fastening elements each comprise a recess having a depth greater than the thickness of said screw head, and a plate covering said recess, said plate having a slot of a size to accept the necks of said screws but smaller than the diameter of said heads, said slot being enlarged adjacent one end to accept the heads of said screws.

11. The structure of claim 10 wherein one at least of said female fastening elements has a spring biased detent under the narrow portion of said slot and spaced from the narrow end of said slot a distance slightly greater than the diameter of said heads, to permit passage of said head into fastening position and to resist passage of said head to disengaging position.

12. The structure of claim 9 wherein the screws on the remaining faces of said posts are positioned with said heads and necks extending from said faces and wherein other partition units with posts separating said units are secured to said remaining faces.

References Cited in the file of this patent

UNITED STATES PATENTS

| | | |
|---|---|---|
| 541,114 | Nolan | June 18, 1895 |
| 735,618 | Tannewitz | Aug. 4, 1903 |
| 742,525 | Tower | Oct. 27, 1903 |
| 1,110,948 | Langdon | Sept. 15, 1914 |
| 1,176,692 | Smith | Mar. 21, 1916 |
| 1,245,923 | Jarmin | Nov. 6, 1917 |
| 1,420,473 | Dawson et al. | June 20, 1922 |
| 1,454,758 | Murphy | May 8, 1923 |
| 1,525,098 | Levene | Feb. 3, 1925 |
| 1,658,211 | Ronai | Feb. 7, 1928 |
| 1,993,593 | Carrozza | Mar. 5, 1935 |
| 2,103,408 | Eddy | Dec. 28, 1937 |

FOREIGN PATENTS

| | | |
|---|---|---|
| 246 | Great Britain | 1888 |
| 259,645 | Great Britain | Oct. 8, 1926 |